(12) United States Patent
Schaal

(10) Patent No.: US 7,909,299 B2
(45) Date of Patent: Mar. 22, 2011

(54) HOLDER FOR A BEVERAGE CONTAINER

(75) Inventor: Falk Schaal, Alpirsbach (DE)

(73) Assignee: Fischer Automotive Systems GmbH & Co. KG, Horb (DE)

( * ) Notice: Subject to any disclaimer, the term of this patent is extended or adjusted under 35 U.S.C. 154(b) by 0 days.

(21) Appl. No.: 12/267,676

(22) Filed: Nov. 10, 2008

(65) Prior Publication Data

US 2009/0127419 A1 May 21, 2009

(30) Foreign Application Priority Data

Nov. 15, 2007 (DE) .......................... 10 2007 054 488

(51) Int. Cl.
*A47K 1/08* (2006.01)
(52) U.S. Cl. ................... 248/311.2; 224/281; 224/926
(58) Field of Classification Search ............... 248/311.2; 224/281, 926
See application file for complete search history.

(56) References Cited

U.S. PATENT DOCUMENTS

| 6,409,136 B1 | 6/2002 | Weiss et al. |
| 6,431,391 B1 * | 8/2002 | Kaupp .......................... 220/737 |
| 7,131,690 B2 * | 11/2006 | Bollaender et al. ...... 297/188.17 |
| 2004/0021050 A1 * | 2/2004 | Izume ........................ 248/311.2 |

FOREIGN PATENT DOCUMENTS

| DE | 199 35 144 | 2/2001 |
| GB | 2 379 203 | 3/2003 |
| WO | 2008/000404 | 1/2008 |

* cited by examiner

*Primary Examiner* — Ramon O Ramirez
(74) *Attorney, Agent, or Firm* — Michael J. Striker

(57) ABSTRACT

A holder for a beverage container, for example a beverage can has a first support in the form of a ring and a second support projecting into the ring, which supports are, for the purpose of raising and lowering, pivotally mounted on a common axis and connected in terms of drive so that, when the second support is pivoted, the first support is moved along with it. A locking element for the first support is unlocked as a result of pivoting the second support.

10 Claims, 2 Drawing Sheets

HOLDER FOR A BEVERAGE CONTAINER

CROSS-REFERENCE TO RELATED APPLICATION

The invention described and claimed hereinbelow is also described in German Patent Application DE 10 2007 054 488.1 filed on Nov. 15, 2007. This German Patent Application, whose subject matter is incorporated here by reference, provides the basis for a claim of priority of invention under 35 U.S.C. 119(a)-(d).

BACKGROUND OF THE INVENTION

The invention relates to a holder for a beverage container. The holder is used in a motor vehicle for holding a beverage container such as, for example, a beverage can, a beaker, a cup or a bottle so that it does not tip over, and is intended for installation in, for example, the central console on the transmission tunnel of the motor vehicle. The invention is not limited to the intended use mentioned.

A holder of such a kind is known from Utility Model DE 93 08 232 U1. The known holder is intended for installation in a shallow compartment at the top of a glove compartment in a motor vehicle. It can be extended outwards in the manner of a drawer by means of a slider. The known holder has a plate which is rectangular or square in plan view and which has a circular hole as an insertion opening for a beverage container. The plate can, because of the hole, be seen as a ring; it forms a support which provides an inserted beverage container with support at its periphery. The plate forming the support in the known holder is mounted at one edge so that it can be pivoted about a horizontal axis and, as a result, moved from a lowered position into a raised position and vice versa. When the plate forming the support is in the lowered position, the known holder is of low height and as a result it can be pushed into a shallow installation space. In the raised position, the known holder provides support at a height sufficient to hold an inserted beverage container.

It is therefore an object of the present invention to propose an alternative beverage container holder which, when not being used, can be stowed in a location of low overall height and which, in use, provides support at a height sufficient to hold an inserted beverage container so that it is prevented from tipping over.

The holder according to the invention has a first support and a second support, both of which can be moved from a lowered position into a raised position and vice versa. In addition to pivotal mountings, other guidance means, for example slideways, are possible for guiding the two supports so that they can be moved up and down between the lowered and raised positions. In the raised position, the two supports provide an inserted beverage container with lateral support at two locations on its periphery.

The lateral support is provided at as many locations on the periphery, and/or extends as far in the peripheral direction, as is required for the inserted beverage container to be supported against tipping over in any direction. The two supports can optionally co-operate with further supports or with components projecting upwards laterally next to the holder, which provide the inserted beverage container with lateral support. It is therefore not mandatory, although it is preferable, for the lateral support for the inserted beverage container to be provided exclusively by the two supports. In the lowered position, the holder has a low overall height.

In accordance with the invention, the two supports are connected in terms of drive; when the second support is raised, it raises the first support along with it and/or, vice versa, the second support, when it is lowered, lowers the first support along with it. The first support is consequently also referred to hereinbelow as the driven support, and the second support as the driving support.

In addition, the holder according to the invention has a locking element, which locks the first support against movement when it is in the raised position and/or in the lowered position. The locking element is unlocked by raising and/or lowering the second support, which means that the locking of the first support is released as a result of raising and/or lowering the second support. As a result, the first support can be driven along with the second support. The locking element can be, for example, a slider or a catch, which comes into engagement with the first support under spring bias and as a result locks the latter against movement. The second support pushes the locking element, at a disengagement surface, for example a bevel, out of engagement with the first support, against the force of the spring element.

The invention has the already mentioned advantages of a low overall height when not in use and of providing support at a nevertheless sufficient height to hold an inserted beverage container so that it is prevented from tipping over. In order to raise and lower the two supports it is necessary only to move the second support; the first support moves along with the second support. The locking element prevents unintentional lowering of the first support; the first support can be lowered only as a result of lowering the second support.

In accordance with an embodiment of the invention, the locking element can be overpowered by pushing down on the raised first support with force. "Overpowered" is understood to mean that the first support, which is basically locked against being pushed down, is nevertheless unlocked and pushed down, that is to say can be lowered, by means of pressure of appropriate force. This avoids the raised first support from being damaged by excessively high pressure.

In an embodiment of the invention, the drive connection of the two supports has movement-allowing play; the two supports especially are resiliently connected to one another, for example by means of a spring element or a resilient rubber element. As a result of the movement-allowing play, the first support can be raised and/or lowered some distance without the second support being raised and/or lowered along with it. By that means, the locking element is unlocked at the start of raising and/or lowering of the first support, before the second support moves along with the first support. The movement-allowing play, provided in accordance with the invention, between the two supports accordingly makes it possible for solely the first support to be moved initially, which is necessary for the second support to be unlocked.

In an embodiment of the invention there is a provided a stopping arrangement against the second support—that is to say the driving support—moving of its own accord. The stopping arrangement can be implemented, for example, by means of friction—that is to say braking—of the second support, a sprung ball mechanism, or a resilient tongue having a hemispherical or triangular tooth-shaped head as a snap-in mechanism.

In accordance with an embodiment of the invention, the spacing of the two raised supports from one another is adjustable. Adjustment of the spacing is possible by moving one of the two supports, although in the case of a pivotal mounting this can be a case of moving further beyond the raised position. Adjustment of the spacing of the two supports allows the holder to be matched to beverage containers of different diameters.

In an embodiment of the invention there is provided a pivotal mount for movably guiding at least one of two supports from the lowered position into the raised position and vice versa. A pivotal mount is a simple and reliable guidance means, which does not have a tendency to jam as a result of twisting. In accordance with a development, both supports have a pivotal mount for their guidance, in which case the pivotal mounts of both supports are located on the same side of a beverage container inserted into the holder. The two pivotal mounts especially have a common axis. This embodiment of the invention makes it possible for the mountings of both supports to be on a common shaft. In addition, pivotal mounting on a common axis or, at least, pivotal mounts that are arranged close to one another make(s) it simpler for the two supports to be connected in terms of drive.

In a preferred embodiment of the invention, the first support is a ring or at least a partial ring, which surrounds an inserted beverage container completely or at least over a part of its periphery which is preferably greater than half the periphery. As a result, two supports pivotally mounted on a common axis make it possible for a beverage container to be held so that it is prevented from tipping over. It is not necessary for the ring to have a circular shape or a hole that is circular.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
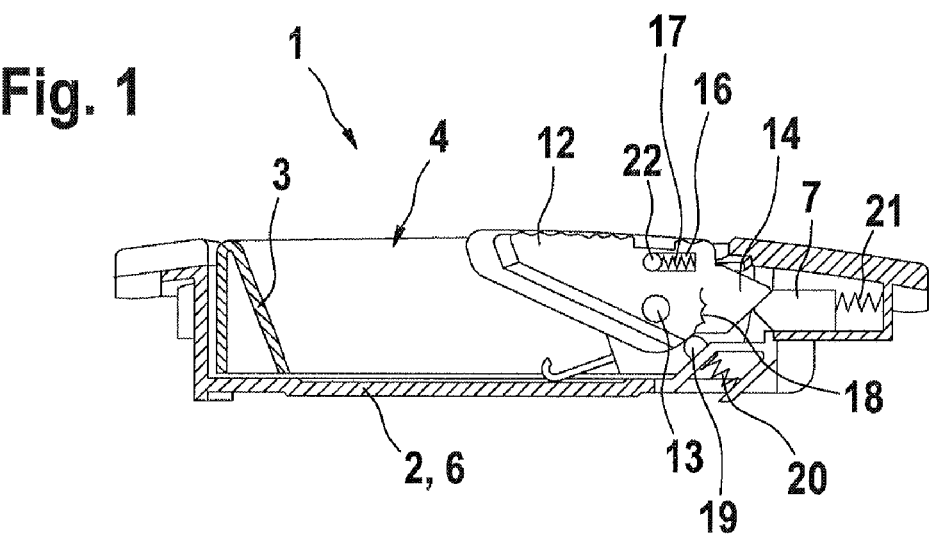
FIGS. 1-3 are sections in a middle plane of a holder according to the invention, in three different positions.

The holder 1 according to the invention, which is shown in the drawings, is used for inserting and holding—so that it does not tip over—a beverage container (not shown) such as, for example, a beverage container, a beaker, a cup or a bottle in the interior of a motor vehicle. The holder 1 is intended for installation in, for example, the central console on the transmission tunnel of the motor vehicle.

The holder 1 has a shallow, box-shaped housing 2 open to the top, in which there is arranged a first support 3. The first support 3 is in the form of a ring, that is to say it has an insertion opening 4, which is approximately circular when seen from above, for the beverage container (not shown). The external periphery of the ring forming the first support 3 is, in a top view, approximately rectangular, with convexly curved sides and rounded corners.

Outside the insertion opening 4, the first support 3 has a pivotal mount 5 (see FIGS. 4 and 5), the notional pivot axis of which extends tangentially to the insertion opening 4 and horizontally, that is to say parallel to a base 6 of the housing 2. The pivotal mount 5 comprises a mounting through-hole in the first support 3 and stump shafts of the housing 2, which engage in the mounting hole laterally from the outside. The mounting hole and the stump shafts of the pivotal mount 5 are not provided with reference numerals of their own. By means of the pivotal mount 5, the ring forming the first support 3 is movably, that is to say pivotally, guided from a lowered position (shown in FIGS. 1 and 4) into a raised position (shown in FIGS. 2, 3 and 5) and vice versa. In the lowered position, the first support 3 is located within the housing 2 and terminates flush with the upper face of the latter. In the raised position, the support 3 projects up out of the housing 2 on a slant.

On the pivotal mount 5 side, outside the first support 3 in the form of a ring, there is arranged in the housing 2 a locking element 7 in the form of a slider. The locking element 7 is displaceable radially with respect to the notional pivot axis of the pivotal mount 5. A spring element 21 in the form of a helical compression spring urges the slider in the direction of the first support 3. When the first support 3 is in the lowered position, the locking element 7 engages in a groove-shaped recess (in this case referred to as a mouth 8) in the first support 3. A flanking part of the mouth 8 lies on top of a first locking surface 9 on the upper face of the locking element 7. The first locking surface 9 extends radially with respect to the notional pivot axis of the pivotal mount 5 so that the locking element 7 locks the first support against raising.

In the upwardly pivoted, that is to say raised, position, a step 10 on the first support 3 lies against a second locking surface 11 of the locking element 7 and, as a result, the first support 3 is locked against lowering, that is to say against pivoting downwards. The first and second locking surfaces 9, 11 (to be seen in FIGS. 4 and 5) of the locking element 7 in the form of a slider and the mouth 8 of the first support 3 are in each case provided in side regions laterally next to a second support 12 to be explained hereinbelow.

Figure 2:
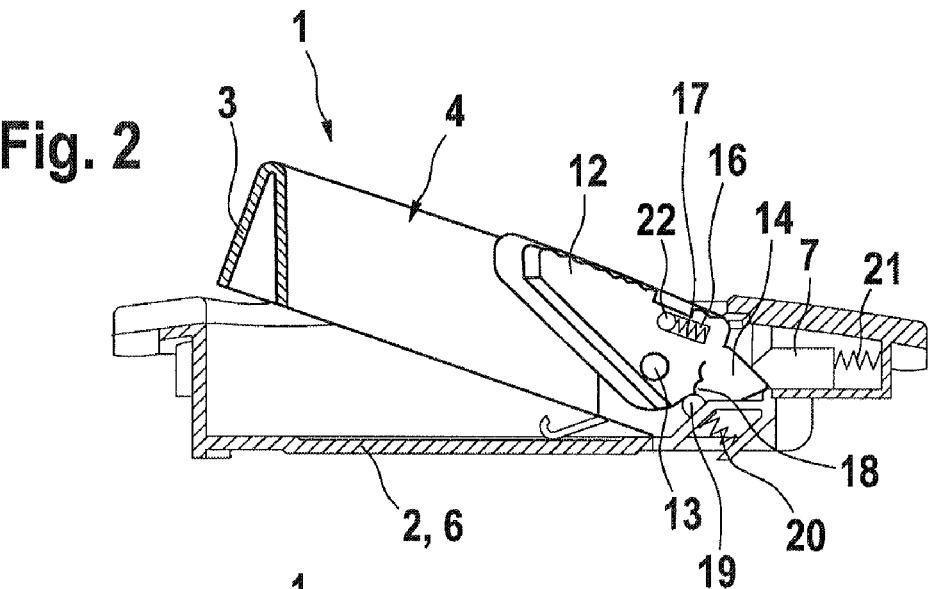
Figure 3:
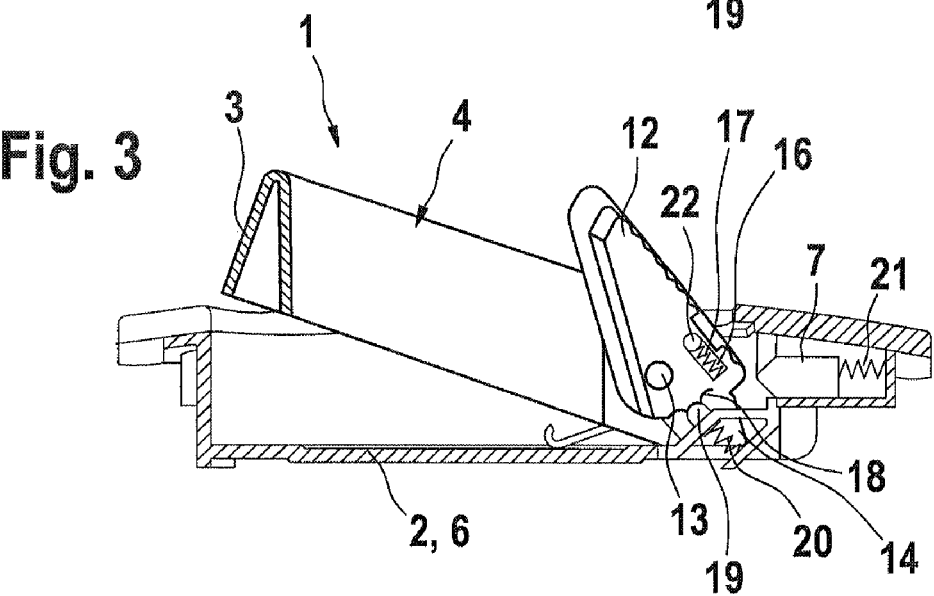

The second support 12 is shown in side view in FIGS. 1-3. It is arranged in a break in the first support 3 in the form of a ring, on the side on which the pivotal mount 5 is located. The second support 12 projects some way into the insertion opening 4 of the first support 3. The second support 12 is, in side view, approximately triangular, the "apex" being rounded or flattened and pointing into the insertion opening 4.

The second support 12 has a pivotal mount 13, which has a common axis with the pivotal mount 5 of the first support 3. A shaft accommodated in the ring forming the first support 3 passes through a mounting hole which extends through the second support 12. The shaft and the mounting hole form the pivotal mount 13 of the second support 12; the shaft and the mounting hole of the pivotal mount 13 are not provided with reference numerals of their own. Like the first support 3, the second support 12 can be pivoted from a lowered position (shown in FIG. 1) up into a raised position (shown in FIG. 2) and vice versa. The tops of the two supports 3, 12 are approximately flush when the two supports 3, 12 are lowered or raised.

On its outer side facing the locking element 7, the second support 12 has a triangular nose 14, which extends parallel to the notional axis of the pivotal mount 13. The nose 14 co-operates with the locking element 7 in the form of a slider, that side of the latter which faces the nose 14 also being, in the region of the nose 14, triangular. The nose 14 and the triangular region of the locking element 7 that co-operates therewith are located in a middle region of the locking element 7, between the first and second locking surfaces 9, 11 (shown in FIGS. 4 and 5), which are provided in side regions of the locking element 7.

When the second support 12 is raised from the lowered position, the nose 14, by virtue of its triangular shape, pushes the locking element 7 in an outwards direction so that the locking element 7 comes out of engagement with the mouth 8 of the first support 3, against the force of the spring element 21. The first support 3 is accordingly unlocked as a result of the second support 12 being raised and can likewise be raised.

When the second support 12 is lowered from the raised position, the nose 14, by virtue of its triangular shape, similarly pushes the locking element 7, against the force of the spring element 21, out of engagement, in this case from the step 10 on the first support 3, so that the first support 3 is unlocked and can be lowered. It is to be noted that the second support 12 unlocks the first support 3 as a result of raising and lowering.

Figure 4:
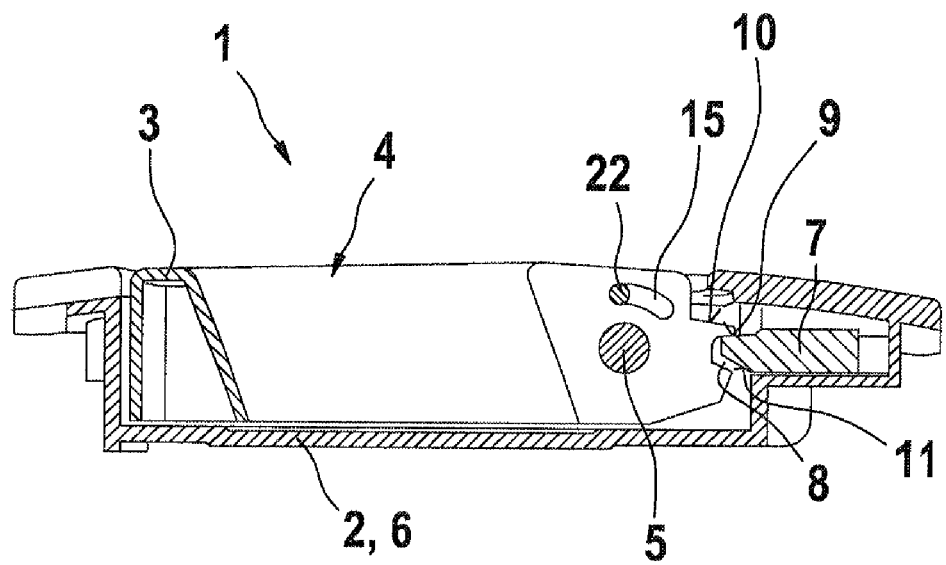
FIGS. 4 and 5 are sections through the holder in a parallel plane offset to the side, in positions corresponding to FIGS. 1 and 2.
Figure 5:
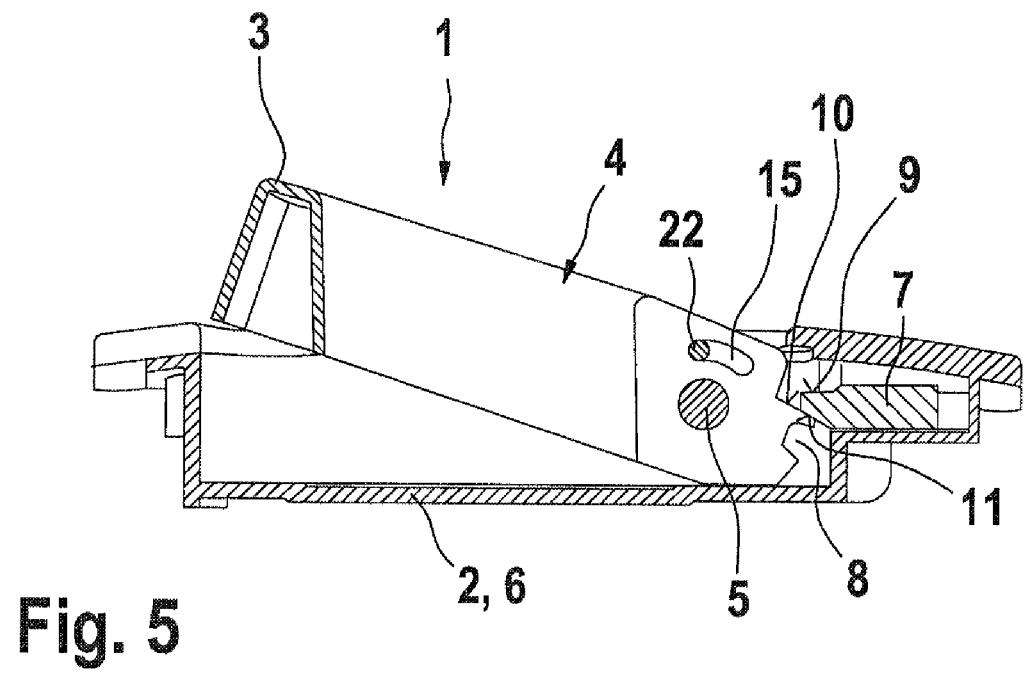

The first support 3 is connected in terms of drive to the second support 12: for the drive connection a pin 22 passes through elongate holes 15, 16 in both supports 3, 12. The pin 22 and the elongate holes 15, 16 extend parallel to the notional axes of the pivotal mounts 5, 13. In addition, the elongate hole in the first support 3, as shown in FIGS. 4 and 5, extends in an arc about the pivot axis of the pivotal mount 5. The elongate hole 16 in the second support 12 extends tangentially to the notional axis of the pivotal mount 13. The ability of the pin 22 to move in the elongate holes 15, 16 gives rise to movement-allowing play; the two supports 3, 12 can be moved, or pivoted, relative to one another through a limited path or angle. The movement-allowing play is sufficient to ensure that the second support 12 can be pivoted to an extent such that it unlocks the first support 3. As a result of a spring element 17 which biases the pin 22, the two supports 3, 12 are resiliently connected to one another and move together with one another when the first support 3 is unlocked. The pin 22, the spring element 17 and the elongate holes 15, 16 form a resilient drive connection for the two supports 3, 12. By means of the drive connection 15, 16, 17, 22, the second support 12 raises the first support 3 along with it and lowers the first support 3 along with it. The second support 12 can also be referred to as the driving support 12, and the first support 3 as the driven support 3.

Laterally next to the triangular nose 14, the second support 12 has ball-shaped recesses 18 on a notional circular path around the axes of the pivotal mounts 5, 13. These co-operate with a latching member 19, which is held in the housing 2 so as to be movable radially with respect to the axes of the pivotal mounts 5, 13. A spring element 20 urges the latching member 19 into the recesses 18 in the second support 12. That end face of the latching member 19 which faces the recesses 18 is hemispherically rounded. The spring-biased latching member 19 and the recesses 18 form a stopping arrangement against the second support 12 moving of its own accord. The stopping arrangement 18, 19, 20 holds the second support 12 in its particular pivoted position.

From the raised position shown in FIG. 2, the second support 12 can be pivoted further up and out, as is shown in FIG. 3. As a result, its spacing from that side of the first support 3 in the form of a ring which is located opposite and, therefore, the clear width of the insertion opening 4 become larger. As a result, matching for beverage containers of different diameters is possible. The first support 3 remains in its upwardly pivoted, raised position, when the second support 12 is pivoted from the raised position shown in FIG. 2 further up and out and also back again into the raised position according to FIG. 2.

The second locking surface 11 on the underside of the locking element 7 in the form of a slider, which locks the first support 3 against lowering from the raised position, does not extend radially with respect to the notional axis of the pivotal mount 5 but rather at a slanting angle thereto. As a result, the locking element 7 can be overpowered, that is to say the first support 3 can be unlocked and pivoted downwards as a result of its being pushed with force. The angle at which the second locking surface 11 extends on a slant relative to a radial of the pivot axis is more acute than the angle of the slanting surfaces of the triangular nose 14 of the second support 12, which normally unlocks the locking element 7 and the first support 3. The force, or moment, for overpowering the locking element 7 and pushing down the first support 3 is therefore higher than on the second support 12. The overpowering capability prevents the holder 1 from being damaged as a result of being pushed down with (excessive) force. Unintentional pushing down of the first support 3 as a result of a lower force is nevertheless avoided.

It will be understood that each of the elements described above, or two or more together, may also find a useful application in other types of constructions differing from the types described above.

While the invention has been illustrated and described as embodied in a holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A holder for a beverage container, comprising a first support movable from a lowered position into a raised position and vice versa, so that said first support in said raised position provides a beverage container inserted in the holder with support at a location laterally; a second support also movable from a lowered position into a raised position and vice versa, so that in said raised position said second support provides a beverage container inserted in the holder with support laterally at a different location on its periphery than said first support, said first support being drivingly connected to said second support so that said second support on being raised raises said first support along with it and on being lowered lowers said first support along with it; and a locking element which acts directly on both said first and second supports and locks said first support against movement in said raised and lowered position, such that only said second support on being raised or lowered unlocks said locking element so that said first support is movable, wherein said first support and said second support have pivotal mounts which are located at a same side of a beverage container inserted in the holder and have a common substantially horizontal axis, and said first and second supports are connected with one another pivotally about an axis extending parallel to said common axis of said pivotal mounts of said first support and said second support.

2. A holder as defined in claim 1, wherein said locking element is configured so as to be overpowered by pushing down said first support in said raised position with force.

3. A holder as defined in claim 1, further comprising a resilient drive connection of said first support to said second support, said driving connection having movement-allowing play and includes a pin extending through an arcurate hole provided in said first support and being arcurate about a pivot axis of the pivotal mount of said first support and an elongate hole provided in said second support and being tangential to a notional axis of the pivot mount of said second support, said pin being movable in said hole with a movement-allowing play and being spring-biased by a spring element to provide the resilient drive connection of said first and second supports with one another.

4. A holder as defined in claim 1, further comprising a stopping arrangement against said second support moving on its own accord.

5. A holder as defined in claim 1, wherein said first support and said second support are arranged so that a spacing from one another of said first support and said second support in said raised position is adjustable.

6. A holder as defined in claim 1, wherein at least one of said supports is raisable and lowerable as a result of pivoting.

7. A holder as defined in claim 1, wherein said first support is configured as a ring.

8. A holder as defined in claim 1, wherein said locking element is movable substantially horizontally and is spring-biased towards said first and second supports, so that in said lowered position of said first support said locking element engages in a recess of said first support and in said lowered position of said second support a first locking surface of said locking element holds said second support from below, so that during raising of said second support from said lowered position to said raised position said second support also pushes said locking element against the spring-bias outwardly out of engagement with said first support and during lowering of said second support from said raised position to said lowered position said second support pushes said locking element against a spring-bias outwardly so that said locking element disengages from said recess of said first support while.

9. A holder for a beverage container, comprising a first support movable from a lowered position into a raised position and vice versa, so that said first support in said raised position provides a beverage container inserted in the holder with support at a location laterally; a second support also movable from a lowered position into a raised position and vice versa, so that in said raised position said second support provides a beverage container inserted in the holder with support laterally at a different location on its periphery than said first support, said first support being drivingly connected to said second support so that said second support on being raised raises said first support along with it and on being lowered lowers said first support along with it; and a locking element which acts directly on both said first and second supports and locks said first support against movement in said raised and lowered position, such that only said second support on being raised or lowered unlocks said locking element so that said first support is movable, wherein said locking element is a one-piece locking element directly acting on said first and second supports, wherein said locking element is movable substantially horizontally and spring-biased towards said first and second supports, so that in said lowered position of said first support said locking element engages in a recess of said first support and in said lowered position of said second support a first locking surface of said locking element holds said second support from below, while in said raised position of said first support said locking element holds said first support by a second locking surface from above, so that during raising of said second support from said lowered position to said raised position said second support pushes said locking element against the spring-bias outwardly out of engagement with said first support and during lowering of said second support from said raised position to said lowered position said second support pushes said locking element against a spring-bias outwardly so that said locking element disengages from said recess of said first support.

10. A holder as defined in claim 8, wherein said locking element has a side which faces said second support and is triangular, and said second support has a nose which is triangular and cooperate with said triangular side of said second support.

* * * * *